Sept. 18, 1962  H. W. WESSELLS III  3,054,636
AUTOMOBILE BODY CONSTRUCTION
Filed Nov. 10, 1960  2 Sheets-Sheet 1
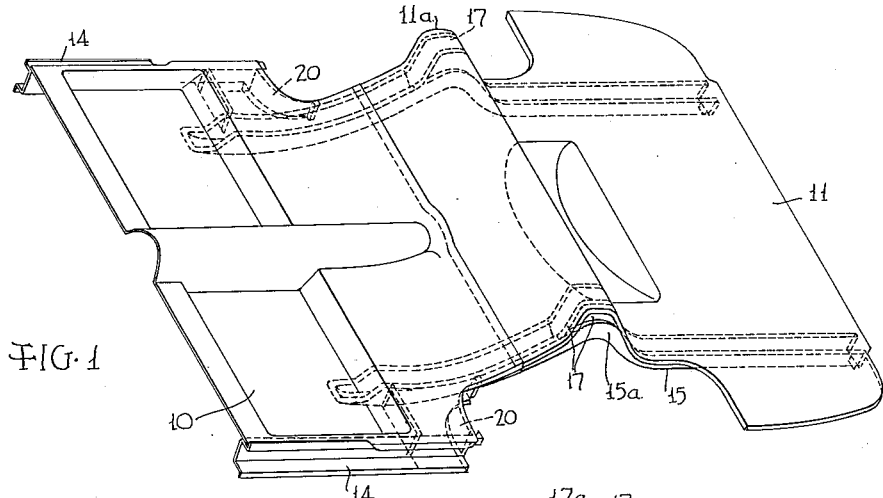
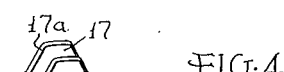
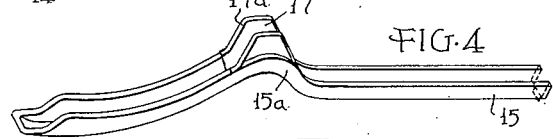
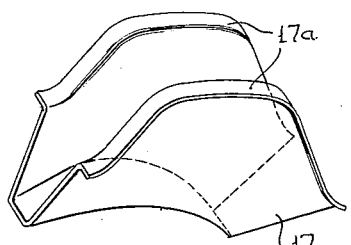
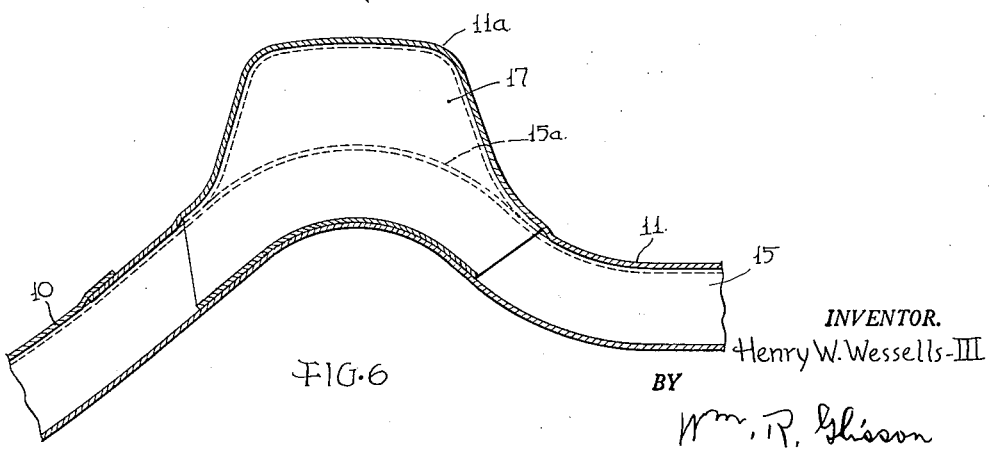
INVENTOR.
Henry W. Wessells-III
BY
Wm. R. Glisson
ATTORNEY Sept. 18, 1962   H. W. WESSELLS III   3,054,636
AUTOMOBILE BODY CONSTRUCTION
Filed Nov. 10, 1960   2 Sheets-Sheet 2
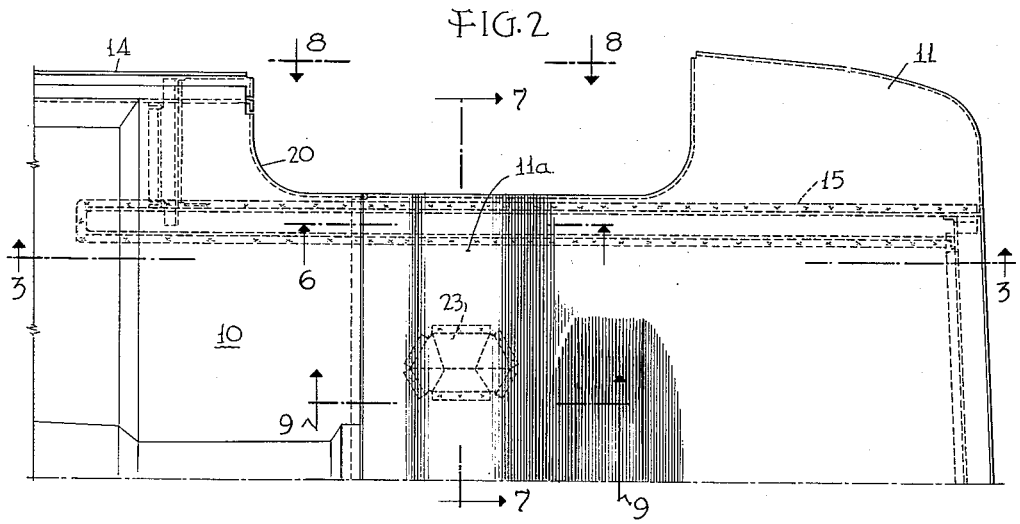
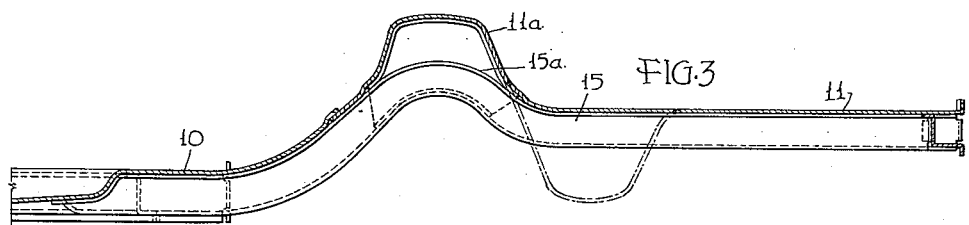
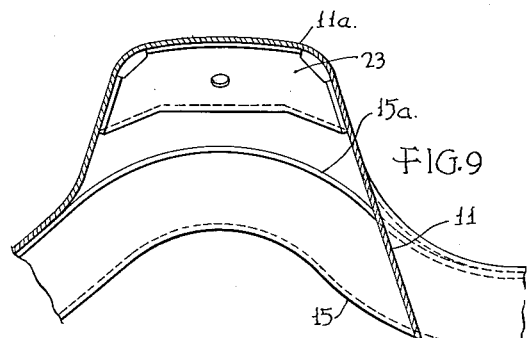
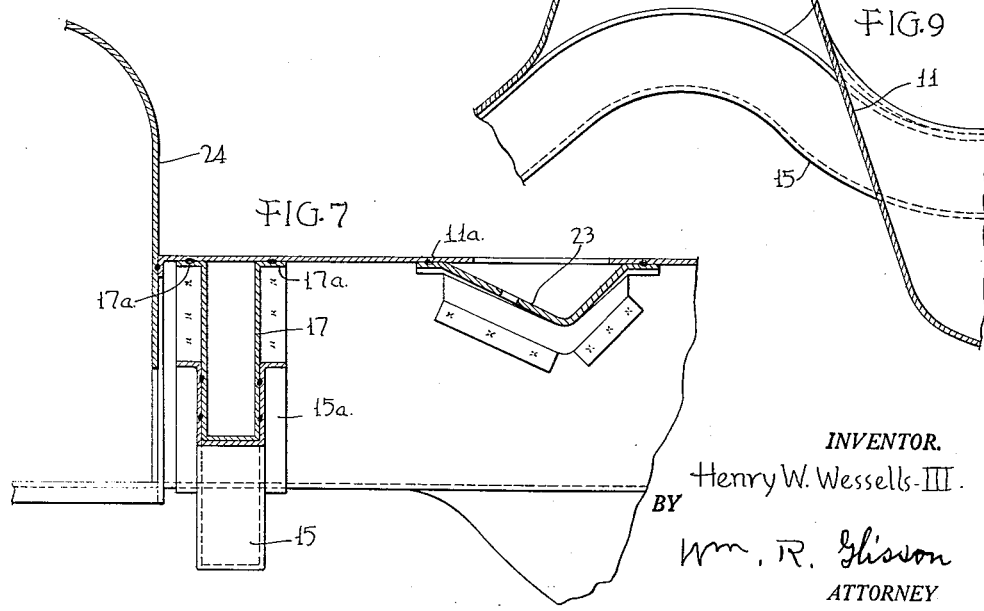
INVENTOR.
Henry W. Wessells III.
BY
Wm. R. Glisson
ATTORNEY United States Patent Office 3,054,636
Patented Sept. 18, 1962

3,054,636
AUTOMOBILE BODY CONSTRUCTION
Henry W. Wessells III, Ardmore, Pa., assignor to The Budd Company, Philadelphia, Pa., a corporation of Pennsylvania
Filed Nov. 10, 1960, Ser. No. 68,436
3 Claims. (Cl. 296—28)

This invention relates to automobile body construction, particularly to an arrangement of a rear side rail and floor pan, and an interconnection between them, and has for an object the provision of improvements in this art.

One of the particular objects of the invention is to provide a simplified form of side rail, one having a minimum amount of bend or kickup to span the rear axle housing.

Another object is to provide a simplified form of floor pan, one having no draw at the sides to reach side rails if such rails are made without a sharp kickup bend.

Another object is to provide a deep and reinforced cross member structure at the rear axle region to reduce torsional deflections in the body and to carry shock absorber connection loads.

Another object is to provide reinforcement for the rear portion of the side rails.

Another object is to provide solid support for rear axle bumpers.

In automobile bodies of unit construction it is common to have stub side rails extending rearward from the rear seat region, each stub rail having a bend or kickup above the rear axle housing. These rails are welded to the floor pan along the inside edge of each wheel housing. These stub rails serve as support for the rear suspension.

The floor pan is shaped to fit these side rails but is formed with additional kickup to clear the rear axle and differential assembly. Usually the shock absorbers are secured to the floor pan near or at the kickup. The prior arrangement requires that the floor pan be given considerable draw on each side to conform at the side edges with the side rails. This makes a troublesome and expensive die operation.

In another construction the side rails are bent deeply to match the deep bend in the floor pan but this is an expensive operation and requires additional structure to place the axle bumper supports where they are wanted.

According to the present invention the side rails are formed with just sufficient bend or kickup to clear the operating range of the axle housings; the floor pan is formed with a deep bend or kickup but without draw on the sides; and a filler gusset is connected between the side rail bend and the floor pan bend. The filler gussets not only provide a strong connection between the side rails and the floor pan, but serve as reinforcement in the critical kickup area and rigidify the structure at the axle bump stops carried by the side rails. They also serve as effective dual bulkheads for the floor pan kickup, thus making it a more effective cross member in the body structure.

The invention will be better understood from the following description of an illustrative embodiment, reference being made to the accompanying drawings thereof wherein:

FIG. 1 is an isometric view of the rear floor pan assembly;

FIG. 2 is an enlarged partial top plan view;

FIG. 3 is a longitudinal vertical section taken on the line 3—3 of FIG. 2;

FIG. 4 is an isometric view of a rear side rail subassembly;

FIG. 5 is an enlarged isometric view of a gusset filler alone;

FIG. 6 is an enlarged longitudinal vertical section taken on the line 6—6 of FIG. 2;

FIG. 7 is an enlarged vertical transverse section taken on the line 7—7 of FIG. 2;

FIG. 8 is a side elevation, partly in section taken on the line 8—8 of FIG. 2; and FIG. 9 is an enlarged longitudinal section taken on the line 9—9 of FIG. 2.

As shown in the drawings, a main floor pan stamping 10 is joined to a rear floor pan stamping 11 having a deep bend or kickup 11a in the region above the rear axle housing location.

A main side rail 14 on each side is secured, as by welding, to the main floor pan stamping 10; and a stub side rail 15 on each side is secured, as by welding, to the rear floor pan stamping 11 except at the bend or kickup 11a where the side rail bend or kickup 15a is spaced from the floor pan.

A gusset filler 17 is secured between the edge of the rear floor pan 11 and the stub side rail 15 in the space between the kickup portions 11a and 15a. The stub rail is of channel shape section with the open side facing upward and the gusset filler is also channel shaped with its bottom and sides secured, as by welding, to the bottom and sides respectively of the stub rail.

The gusset filler closely fits the stub rail and the interior surface of the bend or kickup of the rear floor pan. It is provided with outturned edge flanges 17a which are secured, as by welding, to the floor pan.

The stub side rail 15 extends forward beyond the rear floor pan and in final assembly is secured, as by welding, to the main floor pan.

The stub side rail 15 is laterally offset at a distance from the main side rail 14 and a box-like filler 20 is secured, as by welding, to the side rails and floor pan.

Spring shackle fittings, not shown, are secured to the stub side rails. A shock absorber fitting 23 is secured on each side to the rear floor pan, local reinforcement being provided if needed. If the fittings are located near the side edges of the rear floor pan the inside flanges of the gusset fillers can be extended to provide the needed local reinforcement. Mountings, not shown, for resilient axle bumper pads are carried beneath the kickup of each stub rail.

The sides of the floor pans are secured by flanges to wheel housings 24.

It will be seen that the new construction provides a very strong and rigid arrangement which is very simple and easy to fabricate.

While one embodiment of the invention has been described for purposes of illustration it is to be understood that there may be various embodiments and modifications within the general scope of the invention.

What is claimed is:

1. An automobile body construction comprising in combination, a side rail, a floor pan having a bend or kickup above the side rail, and a filler gusset having marginal flanges closely fitting within the bend of the pan and secured thereto around the edges of the body of the gusset, and the gusset also being secured to the side rail in the space spanned by said bend in the floor pan.

2. An automobile body construction comprising in combination, a side rail, a floor pan having a bend or kickup above the side rail, and a filler gusset having marginal flanges closely fitting within the bend of the pan and secured thereto around the edges of the body of the gusset, and the gusset also being secured to the side rail in the space spanned by said bend in the floor pan, said side rail having a lateral wall portion extending from a vertical side portion and said gusset having a lateral wall portion lying against the lateral wall portion of the side rail.

3. An automobile body construction comprising in combination, a side rail, a floor pan having a bend or kickup above the side rail, and a filler gusset having marginal flanges closely fitting within the bend of the pan and secured thereto around the edges of the body of the gusset, and the gusset also being secured to the side rail in the space spanned by said bend in the floor pan, said side rail being channel-shaped in cross section with the open side of the section facing upwardly toward the floor pan, and said filler gusset being matingly channel-shaped to fit within the side rail and secured thereto.

References Cited in the file of this patent
UNITED STATES PATENTS

| | | |
|---|---|---|
| 2,113,075 | Breer et al. | Apr. 5, 1938 |
| 2,370,211 | Ulrich | Feb. 27, 1945 |
| 2,972,498 | Kelley | Feb. 21, 1961 |